Figure 1:
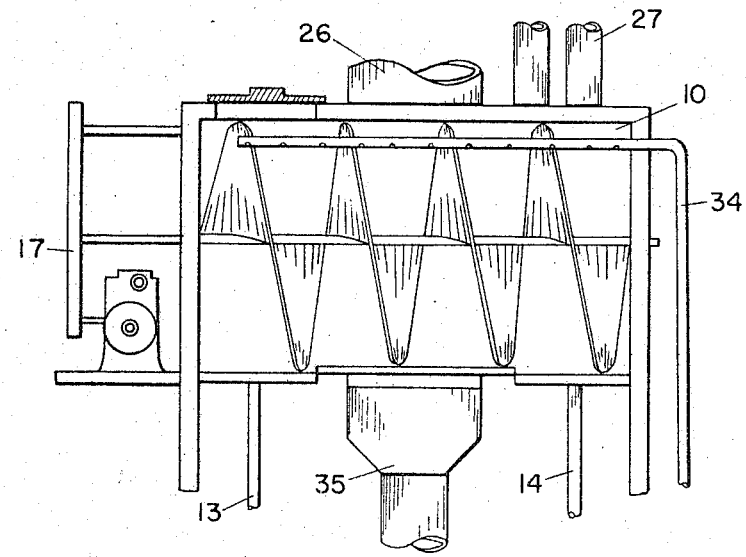

March 14, 1967 R. M. HELMER 3,309,320
PROCESS FOR THE PREPARATION OF DRY CONCENTRATED ACID
Filed Feb. 3, 1964 2 Sheets-Sheet 1

Inventor
Ronald M. Helmer
By Stevens, Davis, Miller & Mosher
Attorneys

United States Patent Office 3,309,320
Patented Mar. 14, 1967

3,309,320
PROCESS FOR THE PREPARATION OF DRY
CONCENTRATED ACID
Ronald M. Helmer, 222 35th Ave. NE.,
Calgary, Alberta, Canada
Filed Feb. 3, 1964, Ser. No. 341,932
Claims priority, application Canada, Apr. 29, 1963,
874,322
5 Claims. (Cl. 252—145)

This invention relates to a process for preparing a dry, free-flowing acid powder by absorbing liquid acids, such as sulphuric, acetic, phosphoric etc., onto a highly surface active finely divided absorbent material which is not affected by the acid.

Solidified acids which are acids such as sulphuric, nitric, muriatic etc., absorbed on finely divided solid materials which are not affected by the acid, such as fossil meal (kieselguhr), comminuted silica, asbestos, and like substances, are disclosed in British Patent No. 4,853 of 1883, issued to Carl Pieper. However, he states that the solidified acid may be formed merely by mixing the acids with the finely divided solid materials to form a powdery mass or a thick paste.

In yet another patent, British Patent No. 221 of 1884 issued to David Urquhart, it is taught that such solidified acids, particularly of sulphuric acid absorbed on infusorial earth may be prepared by a process which involves adding the required amount of acid to the infusorial earth powder and then continuously and intimately mixing the powder with the acid. In this manner, the patentee states that he may produce continuously the semi-dry powder.

Nevertheless, the processes discussed by the above prior art suffers many practical disadvantages. The process of mixing requires close regulation and control due to the large amount of heat exothermically evolved during the mixing process. If the surface active material is agitated too vigorously during the addition of the liquid acid, and/or if sufficient cooling is not imparted to the mixture, a critical point is reached at which the mixture "blows-off," expanding greatly in volume and becoming unmanageable. Even with sealed mixing apparatus properly vented to the atmosphere, the occurrence of this phenomenon will result in the loss of up to 50% of the total mass of the mixture, through "blowing-off" out of the mixer.

It is, therefore, a prime feature of the present invention to provide a process for conveniently, safely and economically preparing dry acids.

It is a preferred feature of the present invention to provide such a process for preparing dry sulphuric acid.

It is a still further preferred feature of the present invention to provide such a process for the preparation of dry sulphuric acid absorbed on a modified diatomaceous earth produced by an hydrothermal reaction with a source of calcium, in which there is at least 80% $H_2SO_4$, by weight.

It is a still further subsidiary feature of the present invention to provide a continuous process for the production of packaged solidified acid, preferably dry $H_2SO_4$.

By a broad aspect of the present invention, there is provided a process for the preparation of a dry concentrated acid which comprises the steps of:

(a) Feeding a predetermined amount of a highly surface active finely divided absorbent material to a confined reaction zone equipped with agitation means and cooling means;

(b) Continuously spraying a predetermined amount of a concentrated acid onto said absorbent material;

(c) Intermittently mixing said absorbent material with said acid while continuously cooling said mixture and correlating each mixing cycle with each "at rest" cycle to restrict the temperature of said absorbent material to below about 212° F.;

(d) Continuously mixing said absorbent material with said acid at a temperature of said absorbent material below about 212° F. while continuously cooling said mixture until all said predetermined amount of said acid has been added; and (e) Continuously mixing said absorbent material with said added acid and continuously cooling said mixture.

Thus, the essence of the present invention involves the use of a mixer enclosed by a cooling jacket through which a cooling fluid is constantly circulated during the mixing process. However, even when such mixing vessel is used, to operate the mixing vanes continuously at a speed of, for example, 30 to 60 revolutions per minute, would result in the "blow-off" of the mixture in spite of the cooling. Accordingly, the present invention is also based on the concept that the mixer should be operated only intermittently and for short periods during the initial stages of the mixing operation. Once the critical stage has been passed, the mixer may be operated continuously at normal speeds until all the acid has been added, and thereafter for as long as it is deemed necessary to provide good and adequate mixing of the ingredients.

For example, the mixer may be cooled by a water jacket, through which cooling water is continuously circulated. The mixer is first charged with a maximum of 25 to 50% (of the volume of the mixer) with the desired highly surface active finely divided material. It is essential that such finely divided material be adequately cooled during the mixing procedure. The maximum amount of such material, therefore, which may be used is a function of the efficiency of the cooling system. However, it is preferred to use a maximum of about 25% (by volume) since, if there is too great a quantity the material will not be cooled quickly enough, and furthermore, it is difficult to obtain adequate intimate mixing.

The required amount of acid is then continuously sprayed onto the added finely divided material. The mixer is then run for controlled intermittent cycles, such as is necessary to maintain the finely divided material at a temperature below about 212° F. If the mixer is run for longer periods, a "critical point" is reached where the temperature exceeds 212° F. and an explosive evolution of water vapour (blow-off) occurs.

Nevertheless, by following the teachings of the present invention and discontinuing the mixing while still spraying the acid, when the temperature of the finely divided powder approaches 212° F., a stage will be reached when continuous mixing does not cause the mixture to reach the aforedefined "critical stage." Then, continuous mixing may take place.

Many types of highly surface active finely divided absorbent materials may be used. Examples include synthetic and naturally occurring silicas and silicates, aluminas and aluminates, diatomaceous earths etc. Particularly advantageous absorbents are those known by the trademark of Micro-Cel. A preferred such Micro-Cel is Micro-Cel E. The Micro-Cels are produced by an hydrothermal reaction of diatomaceous earth with a source of calcium. The physical properties of various Micro-Cels are given in the following table.

TABLE 1.—PHYSICAL PROPERTIES OF VARIOUS MICRO-CELS

| Grade of Micro-Cel | Moisture Content, weight percent | Particle Size, microns | Surface Area, sq. metres/gm. | Water Absorption, percent by weight |
|---|---|---|---|---|
| Micro-Cel A | 6.0 | 0.02–0.03 | 150 | 425 |
| Micro-Cel B | 4.5 | 0.02–0.07 | 150 | 240 |
| Micro-Cel C | 6.5 | 0.02–0.03 | 175 | 425 |
| Micro-Cel E | 4.0 | 0.02 | 95 | 560 |

Various acids and strengths of acids may be used, but the preferred acids are sulphuric acid, phosphoric acid and acetic acid. Hydrochloric acid may not, however, be used.

The concentration of the acids may vary, but preferably concentrated acids should be used. A concentration of sulphuric acid of 80% or higher is useful. A particularly preferred concentration of sulphuric acid is 60° Baumé.

Figure 2:
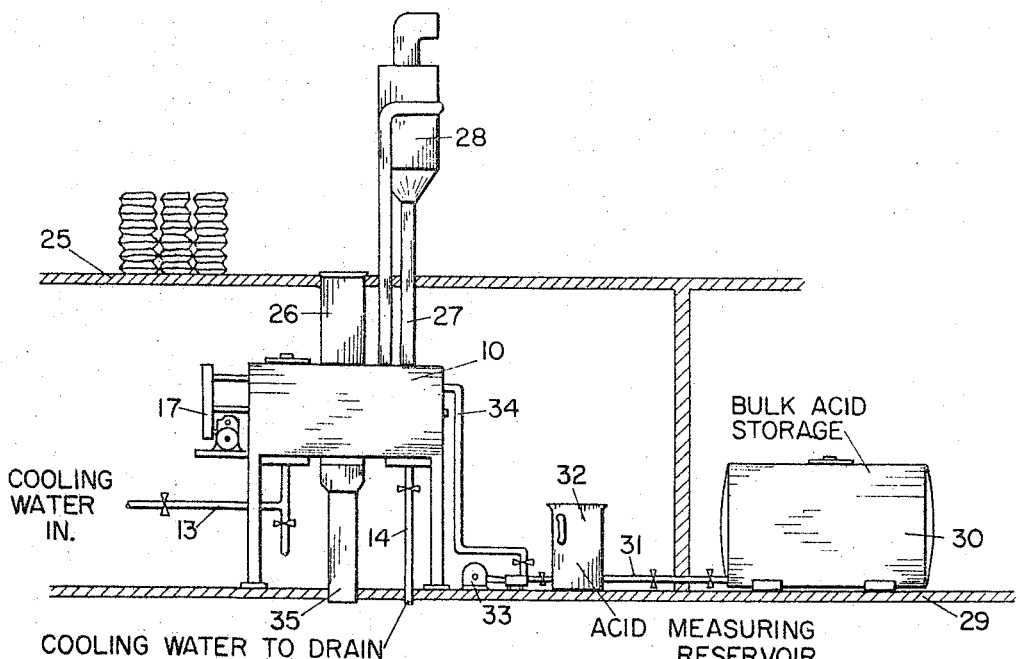
Figure 3:
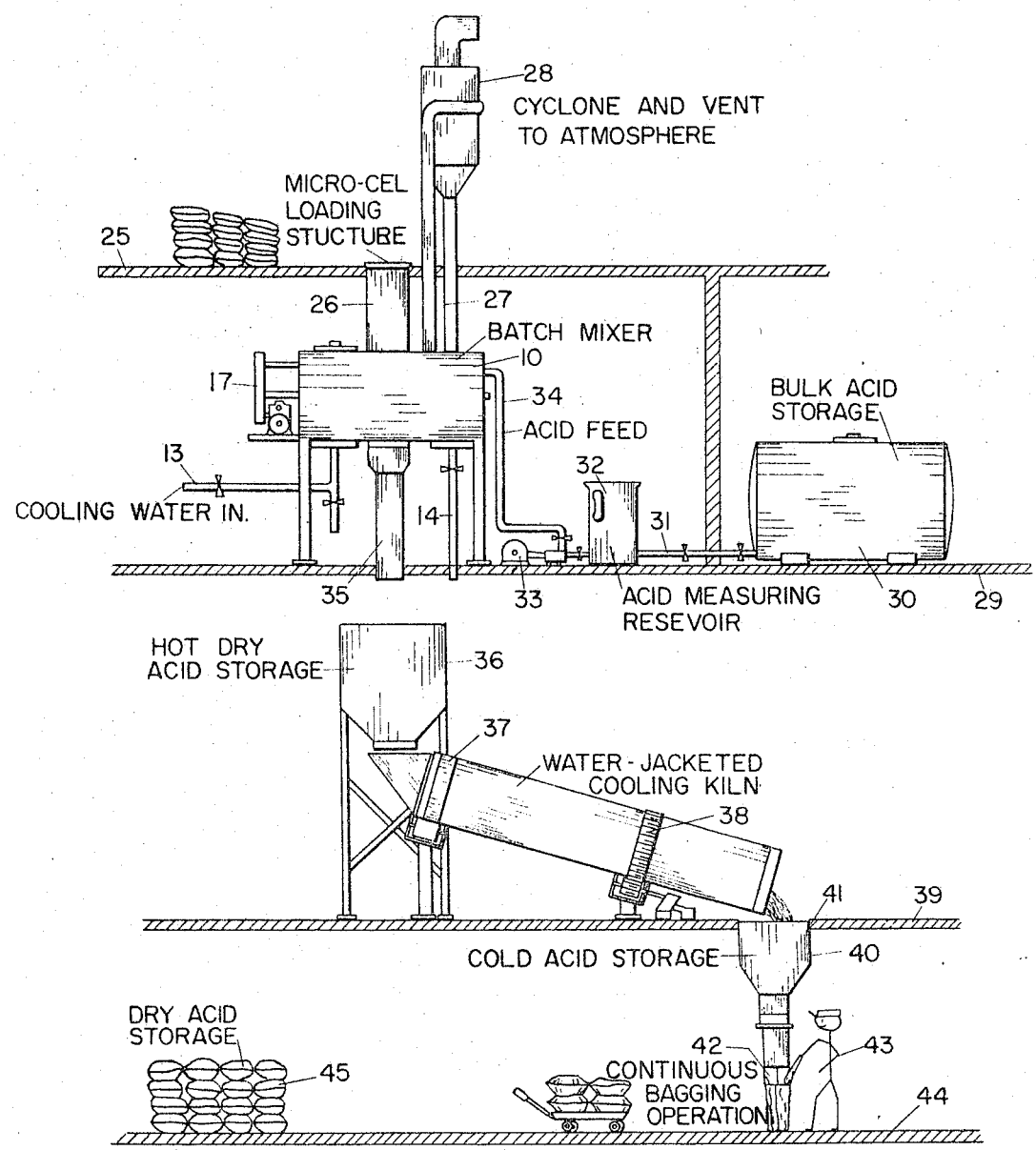

In drawings which illustrate embodiments of the present invention,

FIG. 1 is a horizontal cross-sectional of a mixing apparatus for use in the present invention, FIG. 2 is a side elevational view, partly diagrammatic of an apparatus for use in the present invention, and FIG. 3 is a side elevational view, partly diagrammatic, of apparatus adapted to carry out a continuous production and bagging of the solidified acid, according to the process of the present invention.

Turning now to FIG. 1, there is shown a mixer, indicated generally at 10 including a shell 11 and surrounded by a cooling jacket 12. The cooling jacket is provided with cooling fluid inlet 13 (usually a water inlet) and a cooling fluid outlet 14 (usually a water drain). Within the shell 11 is a screw-conveyor type of agitation 15, mounted on a shaft 16 driven by motor 17 and riding in bearing 18 at its opposite end. The mixer 10 is also provided with an inlet port 19, an outlet port 20 and a vent port 21.

Within the mixer 10 is an acid distribution pipe line 22 provided with a plurality of longitudinally spaced apertures defining a plurality of nozzles 23.

Turning to FIG. 2, it is noted that there is provided a storage and loading platform 25, through which a chute 26 communicates with the inlet port 19. The outlet port 20 is connected by a conduit 27 through the platform to a cyclone separator 28 which separates the finely divided dust rising from the mixer from gases which is returned via conduit 27' and vents the gases to the atmosphere via conduit 27".

Below platform 25 is a floor 29 on which is mounted a bulk-acid storage tank 30. Bulk acid storage tank 30 communicates via valved line 31 to an acid measuring reservoir 32. From the reservoir 32, a metered amount of acid is pumped by pump 33 through acid feed line 34 to acid pipe line 22.

The dry mixed acid and finely divided absorbent is discharged through discharge chute 35.

FIG. 3 shows the embodiment of FIG. 2 coupled to further apparatus to provide a continuous process for producing and bagging the dry acid.

The hot dry acid discharged through discharge chute 35 enters a hot dry acid storage bin 36, from where it travels to a rotary water jacketed cooling drum 37, driven by a ring gear drive 38. It is noted that storage bin 36 and cooling drum 37 are mounted on a floor 39.

The discharge from the cooling drum 38 enters a cold acid storage bin 40, through a port 41 in the floor 39. From the bin 40 the dry cold acid is bagged on a conventional bagging machine 42 by an operator 43 standing in a floor 44. The bagged dry acid is then transported to a storage area 45.

The following example is given to illustrate a typical procedure following the teachings of the present invention.

167 lbs. of Micro-Cel E was loaded into the batch mixer and distributed by mixing for approximately 10 seconds. Then sulphuric acid of concentration 66° Baumé was permitted to flow by gravity into the measuring reservoir until 668 lbs. had been transferred. The acid was measured volumetrically by means of a gauge glass on the reservoir. Acid pumping was then commenced and the acid was fed into the mixer at a rate of approximately 2 gallons per minute through a ½ inch diameter pipe 7'6" in length drilled at 11 inch intervals with 1/16" holes to provide nozzles.

When the acid addition has proceeded for approximately two minutes, the mixer equipped with narrow helical mixing blades, was started, and the spindle rotated at a speed of 32 r.p.m., for approximately two seconds and then shut off. Acid feed and cooling water circulation was carried out continuously throughout the mixing period. The mixture is cooled and each "mixing cycle" is correlated with each "at rest" cycle to restrict the temperature of the absorbent material to below about 212° F. Intermittent mixing was carried out according to the following schedule for a mix requiring one hour to complete:

Time (minutes):
    0    Acid addition begins
    2    Mix for two seconds
    3    Mix for two seconds
    4    Mix for two seconds
    5    Mix for three seconds
    6    Mix for three seconds
    7    Mix for three seconds
    8    Mix for five seconds
    9    Mix for five seconds
    10   Mix for five seconds At this point approximately two-thirds of the acid had been transferred to the mixer. A barely perceptible "blow-off" was noticed at this point. When this critical point was passed, however, mixing was then conducted continuously until the acid addition was completed. Thereafter, the mixing was conducted continuously until the mix was sufficiently cool for bagging, approximately one hour from the time acid addition was commenced.

The dry acid so formed had the following characteristics. The product was a dry white powder of bulk density 36.2 lb./ft.$^3$, 98% of which being available for reaction purposes.

I claim:

1. A process for the preparation of a dry concentrated acid which comprises the steps of:

(a) feeding a predetermined amount of a highly surface active finely divided absorbent material selected from the group consisting of synthetic and naturally occurring silicas and silicates, aluminas and aluminates and diatomaceous earths to a confined reaction zone equipped with agitation means and cooling means;

(b) continuously spraying a predetermined amount of a concentrated acid selected from the group consisting of sulphuric acid, phosphoric acid and acetic acid onto said absorbent material;

(c) intermittently mixing said absorbent material with said acid while continuously cooling said mixture and correlating each mixing cycle with each "at rest" cycle to restrict the temperature of said absorbent material to below about 212° F.;

(d) continuously mixing said absorbent material with said acid at a temperature of said absorbent material below about 212° F. while continuously cooling said mixture until all said predetermined amount of said acid has been added; and (e) continuously mixing said absorbent material with said added acid and continuously cooling said mixture; said dry concentrated acid containing at least 80% by weight of said sprayed concentrated acid.

2. A process for the preparation of dry concentrated sulphuric acid which comprises the steps of:
   (a) feeding a predetermined amount of a highly surface active finely divided absorbent material selected from the group consisting of synthetic and naturally occurring silicas and silicates, aluminas and aluminates and diatomaceous earths to a confined reaction zone equipped with agitation means and cooling means;
   (b) continuously spraying a predetermined amount of concentrated sulphuric acid onto said absorbent material;
   (c) intermittently mixing said absorbent material with said acid while continuously cooling said mixture and correlating each mixing cycle with each "at rest" cycle to restrict the temperature of said absorbent material to below about 212° F.;
   (d) continuously mixing said absorbent material with said acid at a temperature of said absorbent material below about 212° F. while continuously cooling said mixture until all said predetermined amount of said acid has been added; and
   (e) continuously mixing said absorbent material with said added acid and continuously cooling said mixture; said dry concentrated acid containing at least 80% by weight of said sprayed concentrated acid.

3. A process for the preparation of a dry concentrated sulphuric acid which comprises the steps of:
   (a) feeding a predetermined amount of a finely divided diatomaceous earth material to a confined reaction zone equipped with agitation means and cooling means;
   (b) continuously spraying a predetermined amount of concentrated sulphuric acid onto said absorbent material;
   (c) intermittently mixing said absorbent material with said acid while continuously cooling said mixture and correlating each mixing cycle with each "at rest" cycle to restrict the temperature of said absorbent material to below about 212° F.;
   (d) continuously mixing said absorbent material with said acid at a temperature of said absorbent material below about 212° F. while continuously cooling said mixture until all said predetermined amount of said acid has been added; and
   (e) continuously mixing said absorbent material with said added acid and continuously cooling said mixture; said dry concentrated acid containing at least 80% by weight of said sprayed concentrated acid.

4. A process for the preparation of a dry concentrated sulphuric acid which comprises the steps of:
   (a) feeding a predetermined amount of finely divided modified diatomaceous earth produced by an hydrothermal reaction of said diatomaceous earth with a source of calcium to a confined reaction zone equipped with agitation means and cooling means;
   (b) continuously spraying a predetermined amount of concentrated sulphuric acid onto said absorbent material;
   (c) intermittently mixing said absorbent material with said acid while continuously cooling said mixture and correlating each mixing cycle with each "at rest" cycle to restrict the temperature of said absorbent material to below about 212° F.;
   (d) continuously mixing said absorbent material with said acid at a temperature of said absorbent material below about 212° F. while continuously cooling said mixture until all said predetermined amount of said acid has been added; and
   (e) continuously mixing said absorbent material with said added acid and continuously cooling said mixture; said dry concentrated acid containing at least 80% by weight of said sprayed concentrated acid.

5. A process for the preparation of dry concentrated sulphuric acid which comprises the steps of:
   (a) feeding a predetermined amount of finely divided modified diatomaceous earth produced by an hydrothermal reaction of said diatomaceous earth with a source of calcium to a confined reaction zone equipped with agitation means and cooling means;
   (b) continuously spraying a predetermined amount of 66° Baumé sulphuric acid onto said modified diatomaceous earth;
   (c) intermittently mixing said modified diatomaceous earth with said acid while continuously cooling said mixture and correlating each mixing cycle with each "at rest" cycle in accordance with the following schedule:

Time (minutes):
| 0 | Acid addition begins |
| 2 | Mix for two seconds |
| 3 | Mix for two seconds |
| 4 | Mix for two seconds |
| 5 | Mix for three seconds |
| 6 | Mix for three seconds |
| 7 | Mix for three seconds |
| 8 | Mix for five seconds |
| 9 | Mix for five seconds |
| 10 | Mix for five seconds | to restrict the temperature of said modified diatomaceous earth to below about 212° F.;
   (d) continuously mixing said modified diatomaceous earth with said acid at a temperature of said modified diatomaceous earth below about 212° F. while continuously cooling said mixture until all said predetermined amount of said acid has been added; and
   (e) continuously mixing said modified diatomaceous earth with said added acid and continuously cooling said mixture, said dry acid containing at least 80% by weight of $H_2SO_4$.

References Cited by the Examiner

UNITED STATES PATENTS

| 1,297,724 | 3/1919 | Patrick | 252—451 X |
| 1,980,569 | 11/1934 | Belden et al. | 252—450 |
| 2,027,948 | 1/1936 | Wollner et al. | 252—450 |
| 2,338,089 | 1/1944 | Bond | 252—451 |
| 2,470,142 | 5/1949 | Chapman et al. | 252—451 |
| 2,941,006 | 6/1960 | Greene | 252—436 X |

FOREIGN PATENTS 221    1884   Great Britain.

LEON D. ROSDOL, *Primary Examiner.*

JULIUS GREENWALD, W. SCHULZ,
*Assistant Examiners.*